United States Patent [19]

Niklas

[11] 3,911,730

[45] Oct. 14, 1975

[54] ULTRASONIC TRANSDUCER PROBE SYSTEM

[75] Inventor: Ludwig Niklas, Lovenich, Germany

[73] Assignee: Krautkramer-Branson, Incorporated, Stamford, Conn.

[22] Filed: June 28, 1974

[21] Appl. No.: 483,941

[30] Foreign Application Priority Data
Sept. 7, 1973  Germany............................ 2345155

[52] U.S. Cl.............................. 73/67.7; 73/67.8 S
[51] Int. Cl.² ....................................... G01N 29/04
[58] Field of Search........... 73/67.7, 67.8 R, 67.8 S, 73/67.9; 340/8 L, 9, 1

[56] References Cited
UNITED STATES PATENTS

| | | | |
|---|---|---|---|
| 3,675,472 | 7/1972 | Kay et al........................... | 73/67.9 X |
| 3,693,415 | 9/1972 | Whittington........................ | 73/67.9 |
| 3,805,596 | 4/1974 | Klahr................................ | 73/67.8 S |
| 3,820,387 | 6/1974 | Grabendorfer et al............. | 73/67.9 |
| 3,881,164 | 4/1975 | Kossoff................................ | 340/1 |

Primary Examiner—Richard C. Queisser
Assistant Examiner—John P. Beauchamp
Attorney, Agent, or Firm—Ervin B. Steinberg; Philip J. Feig

[57] ABSTRACT

An ultrasonic transducer system comprises a one or two dimensional array of transducers which are subdivided into groups. The groups are selected and operated simultaneously in a manner to produce acoustic energy beams which provide an interference pattern in the near-field focal zone. The groups, moreover, are shifted incrementally along a predetermined direction to provide a scan along a workpiece surface. The transducer system, operating in a manner similar to a Fresnel zone lens, yields greatly improved image resolution, particularly when used in conjunction with a B- or C-scan presentation.

17 Claims, 8 Drawing Figures

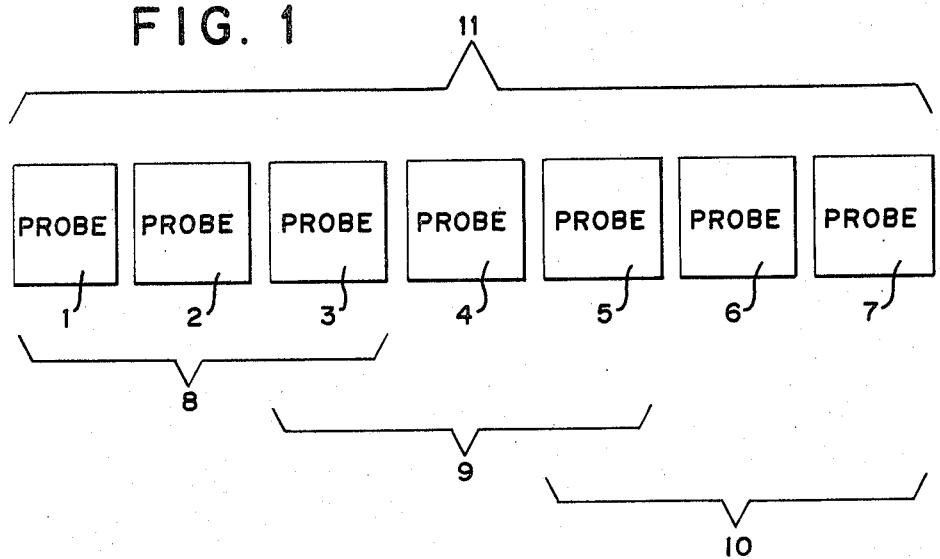
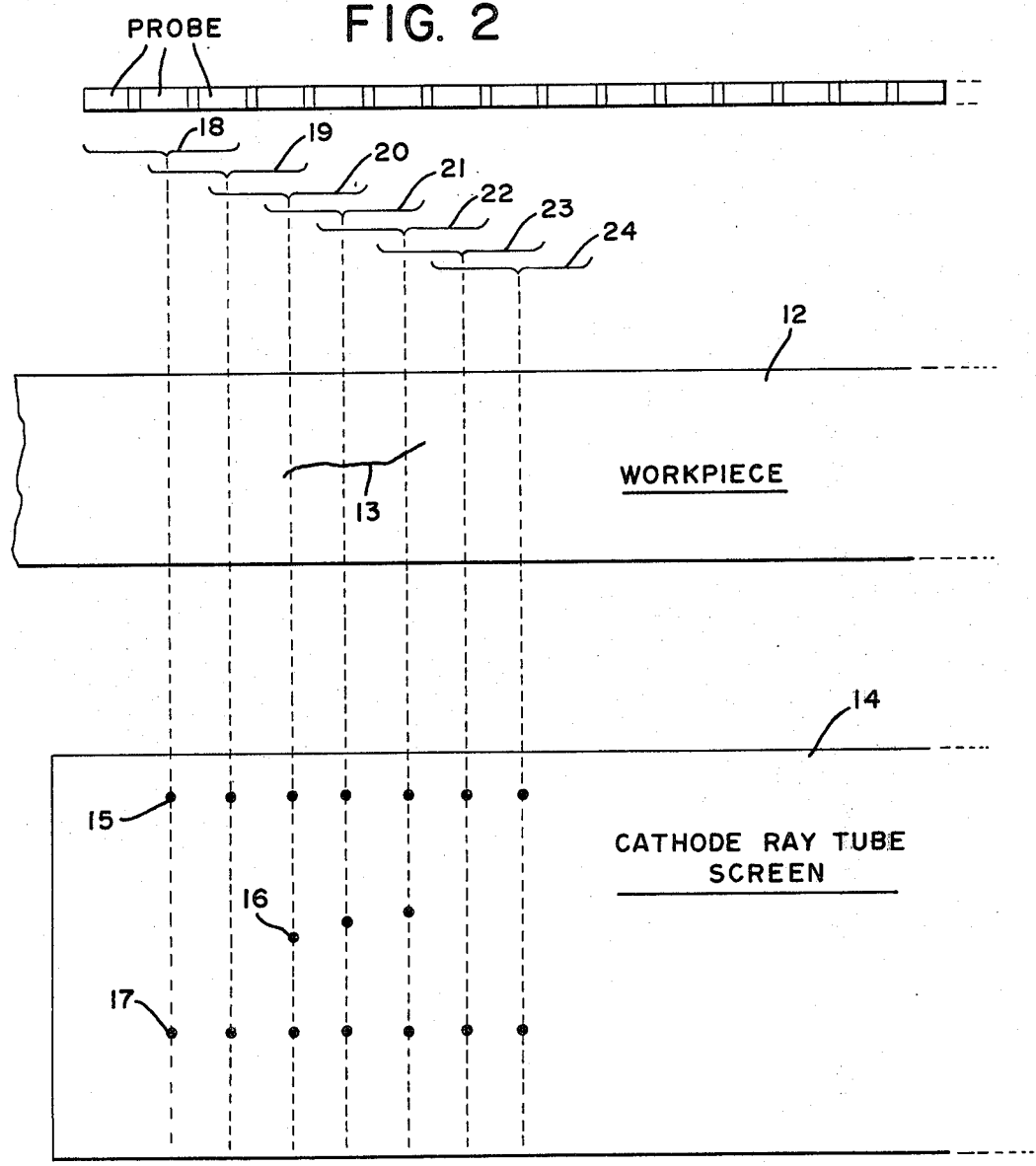

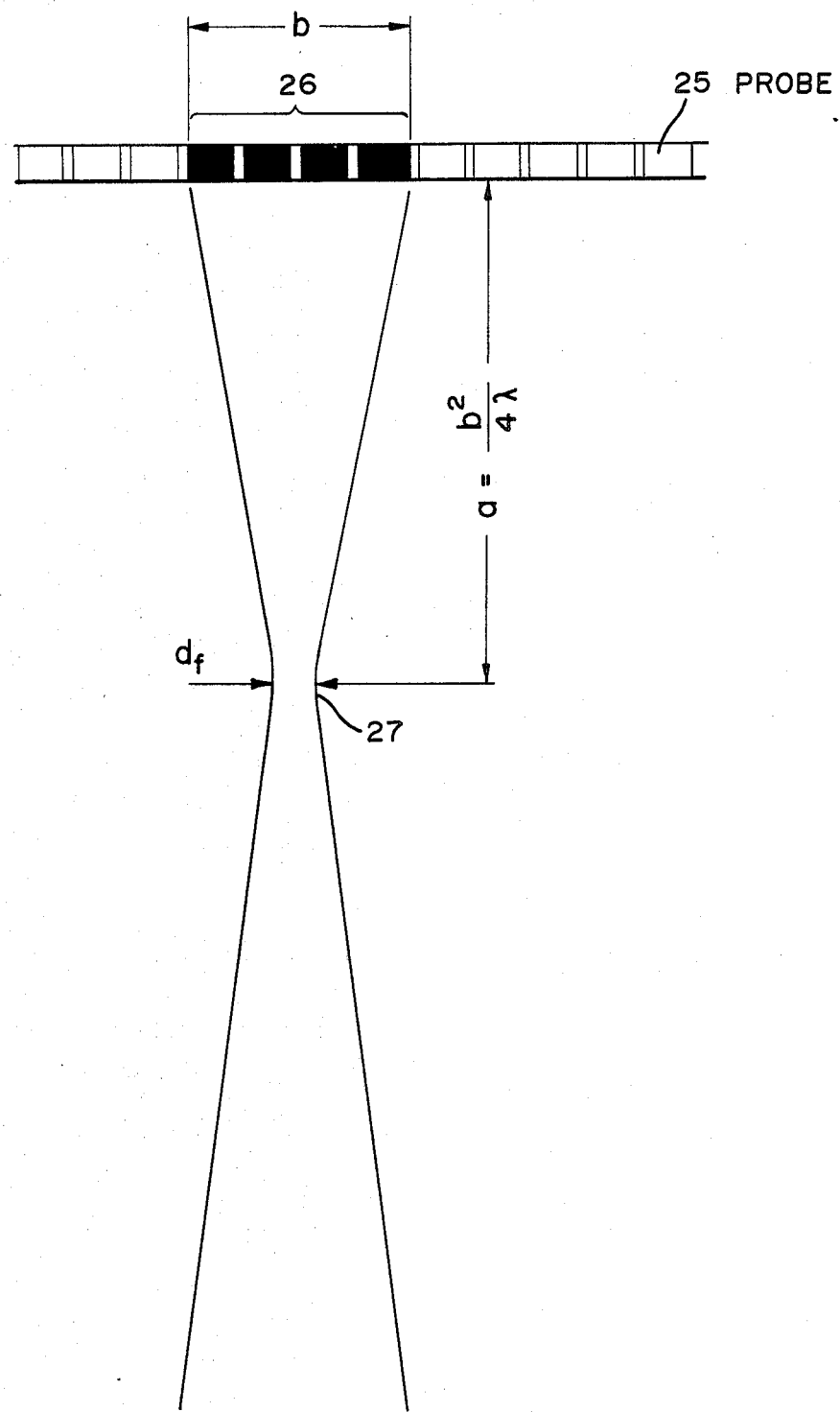

ULTRASONIC TRANSDUCER PROBE SYSTEM

BACKGROUND OF THE INVENTION

This invention refers to an utrasonic probe system for testing large workpiece surface areas by the nondestructive pulse-echo test method. More specifically, this invention concerns a probe system comprising an array of linear and/or perpendicularly thereto disposed band-like individual transducer elements which are operable successively, in groups, and in timed sequence.

In Application for U.S. Patent of W. Grabendorfer et al. Ser. No. 350,167, filed Apr. 11, 1973, entitled "Probe System for Ultrasonic Nondestructive Testing", now U.S. Pat. No. 3,820,387, dated June 28, 1974, there has been disclosed an arrangement comprising a linear array of individual transducers, the transducers being divided into groups of at least two transducers which are pulsed simultaneously. The groups are operated in a given sequence in such a manner that during a predetermined quantity of switching operations, for instance three switching operations, several transducer elements of the system operate once as a transmitter or receiver of ultrasonic energy, whereas other transducer elements are operated more then once.

In this manner an improved arrangement for testing a large surface area of a workpiece is achieved without gaps. The linearly disposed transducer elements are combined into groups of simultaneously operated transducer elements and the groups forming the array are switched sequentially at a predetermined switching frequency. In accordance with this procedure it is known that the echo signals obtained thereby can be displayed in a correct position which is indicative of the size and location of the reflecting surface causing such echoes.

The present invention concerns an improvment of the previously described arrangement and quite specifically, discloses the simultaneous operation of certain groups of transducer probes and/or of band-type transducer probes to provide improved image resolution of a defect. To this end, the instant invention provides linear and area transducer arrays which are operated in a manner resembling that of a Fresnel zone lens, using the nearfield focal field as the preferred focal distance.

The general arrangement and combination of the means constituting this invention will be more clearly apparent by reference to the following description when taken in conjunction with the accompanying drawings.

BRIEF DESCRIPTION OF THE DRAWINGS

FIG. 1 is a schematic plan view of a transducer probe arrangement disclosed previously;

FIG. 2 is a schematic illustration for explaining the production of a B-scan representation using a transducer probe arrangement similar to that disclosed in FIG. 1;

FIG. 3 is a plot for illustrating the near-field focus effect;

DETAILED DESCRIPTION OF THE INVENTION

Figure 4:
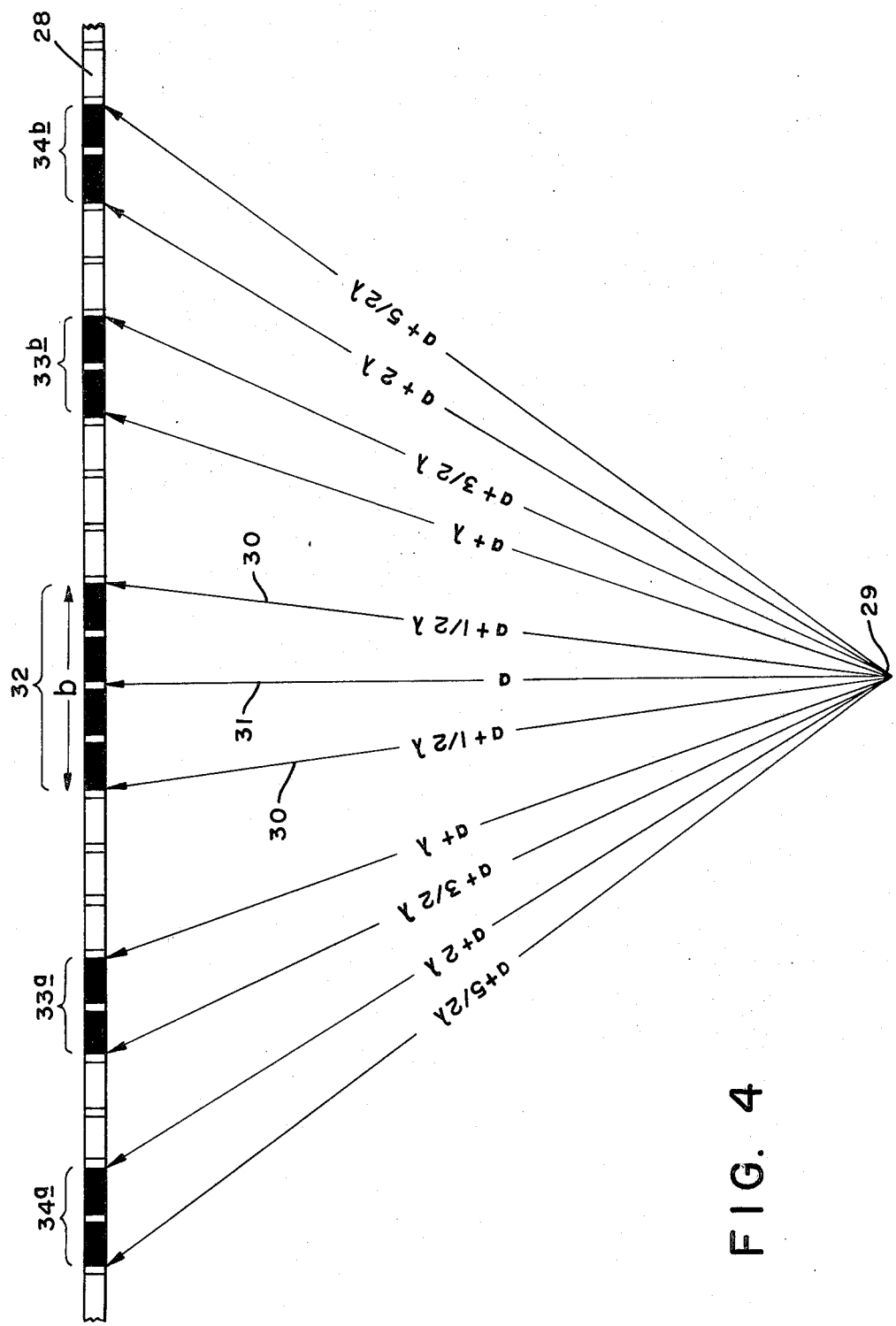
FIG. 4 is a schematic plan view of a transducer probe arrangement and illustrating a certain mode of operation for achieving improved image resolution.

Referring now to the figures and FIGS. 1 and 2 in particular, FIG. 1 discloses a linear array 11 of transducer probes designated by numerals 1, 2, 3, 4, 5, 6 and 7, which are divided into three groups 8, 9 and 10 as disclosed in the patent to Garbendorfer et al. supra. During a first time interval group 8 is rendered active so that the transducer elements 1, 2 and 3 are operated. During the next interval the group 9 comprising elements 3, 4 and 5 is operated. As will be apparent, during the span of these two intervals, the transducer element 3 is operated twice whereas the other elements are operated only once. The described procedure is continued as has been disclosed in the heretofore mentioned patent. In this manner, a large surface area of a workpiece may be ultrasonically scanned for defects without leaving untested gaps in the workpiece.

FIG. 2 illustrates the construction of a B-scan presentation. The groups of transducer probes in FIG. 2 are designated with the numerals 18 through 24. During the first time interval the group 18 comprising three transducer elements, such as the elements or transducer probes 1, 2 and 3 per FIG. 1, transmit a respective ultrasonic pulse signal into the workpiece 12. The respective ultrasonic pulse energy transmitted (illustrated by the dashed lines) is reflected at the entrant surface and at the rear surface of the workpiece 12 and is received again by the probes comprising the group 18 as is well understood by those skilled in the art. If the echo responsive electrical signals are amplified and coupled to the beam intensity control of a cathode ray tube, which tube receives at its vertical deflection plates a synchronized time sweep signal, the screen 14 of the oscilloscope tube will display respective spots 15 and 17 corresponding to the respective transit times of the associated echo signals in the workpiece 12 which signals, as is understood by those skilled in the art, are characterized by different transit times.

During the second time interval the group 19 is operated, which group is displaced from the group 18 by one transducer probe. Concurrently with the stepping signal, which provides the lateral shift of the transducer probe group, the time axis of the oscilloscope is shifted from the left of the screen edge toward the right by feeding a suitable staircase waveform voltage to the X-axis deflection plates. During this second time interval the same indication is obtained as in the preceding one. During the third time interval transducer probe group 20 is activated.

In the event a reflecting surface, such as an anomaly 13, is disposed in the workpiece, an additional image point 16 is displayed on the CRT screen, such image point being related, of course, to the position of the defect 13. If the entire array 11 is continued to be incrementally stepped and if simultaneously a staircase waveform voltage is applied to the X-deflection plates of the oscilloscope, which voltage is increased by one step concurrently with each incremental shift of the transducer probe arrangement, a cross-sectional view of the workpiece 12 is obtained. Such presentation characterized by high lateral resolution (in the X-direction) is very advantageous in many applications of the pulseecho test method, particularly when it is desired to determine the lateral dimension of a defect in the nondestructive test technique, or in medical diagnosis for displaying an image of the internal organs.

A "high resolution" as used herein shall mean that the bundle of sound energy produced by probe groups 18, 19, 20, 21 etc. at the location of the reflecting surface 13 is smaller than the group skip (distance of the probes forming the lineal array upon incremental stepping of the group by one element per step). If the sound beam is wider than the distance between the elements, the image 16 will be blurred in the lateral direction, that is, the image 16 is wider than the actual defect 13. Not only is a blurred image disturbing in the described example of a B-scan presentation, but such blurring also complicates determination of defect size when using electronic data processing means which are favored for nondestructive testing of materials. When determining by electronic means the size of a defect, the quantity of groups of transducer elements receiving an echo signal from the defect 13 is counted and this number is multiplied by the distance from the middle of one element to the middle of the next element or from gap to gap to provide immediately a value indicative of the defect size.

In the patent supra, the problem of sound beam width has already been outlined including the different behavior of the relation of beam width to group width in the far- and near-field of the probe groups 18, 19 and 20, etc. As is known from the literature ("Ultrasonic Testing of Materials" by J. & H. Krautkramer, 2nd ed. Springer Verlag 1969, Chapter 1.8), the sound beam in the near-field follows the relation:

$$a \approx b^2/4\lambda$$

and exhibits a contraction 27, see FIG. 3, known as "natural near-field focus." In the above equation, the letter $a$ is the distance from the transducer probes to the near-field focal area, $b$ is the width of the probes in group 26 operated concurrently, FIG. 3, and $\lambda$ is the wavelength of sound in the workpiece 12.

In order to obtain an optimum sharp image of a reflector (anomaly), the width $b$ of the probe groups should be selected in accordance with the above stated formula to provide the relation:

$$b \approx 2\sqrt{a\lambda}$$

Figure 5:
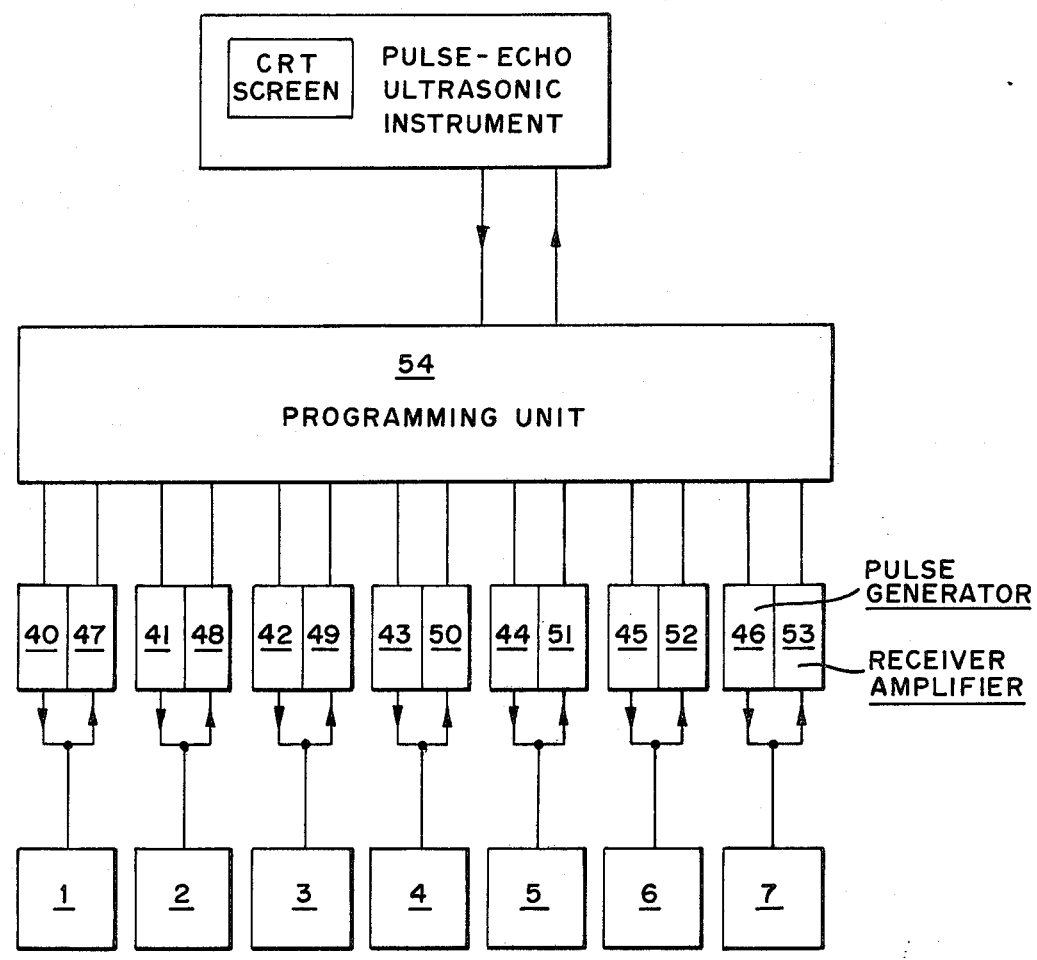
FIG. 5 is a schematic block diagram of the switching circuit.

The operation of the probes in accordance with this formula, when once determined, is readily accomplished by a programming unit 54, FIG. 5, as has been described in the patent supra.

The approximate diameter 27 of the beam contraction $d_f$ has been stated to be:

$$d_f \approx a\lambda/2\,b$$

Assuming that the probe group width has been selected for its optimum size following the formula above, the optimum lateral resolution for such a group of transducer probes becomes:

$$d_{opt} \approx \tfrac{1}{4}\sqrt{a\lambda}$$

This value cannot be reduced by dividing the transducer probe array into smaller individual elements. However, this resolution capability, in practice, is frequently insufficient particularly when for the distance $a$ larger values are involved.

It is an object of this invention to overcome the indicated disadvantages resulting from the use of a group of simultaneously operated transducer probes and to increase the lateral resolution several times. In order to achieve this result the invention discloses the use of transducer probes disposed outside of a particular group, such as group 26 of FIG. 3, for providing "focussing assistance."

Referring now to FIG. 4, an embodiment for obtaining improved lateral resolution, a linear array 28 of transducer probes is shown. The probes operated simultaneously are shown in solid color. The center group 32 of probes is identical with the group 26 of FIG. 3. In accordance with the Fresnel zone construction the phenomenon of the near-field focus effect is based upon the fact that all probes of the array 28 within the group 32 provide a positive pressure, that is, make an effective contribution to the sound wave pressure at the focal point 29. The formula above for the near-field distance states nothing else except that the boundary of the sound wave beams 30 with respect to the central axis 31 are longer by one-half wavelength of sound in the workpiece, see FIG. 4. For locations to the left or to the right of the focal point 29 the distance differences exceed one-half wavelength, that is the respective probes make a negative or subtractive contribution to the sound wave pressure. However, if in accordance with the present invention the probes belonging to auxiliary or subgroups 33a, 33b and 34a 34b are used concurrently these probes also make a positive contribution to the sound pressure at the focal point 29, i.e. the sound waves from the probes arrive at point 29 in phase. In accordance with this invention, the location of these probes along the probe array is calculated in such a manner that the distance of these probes from the focal point assumes the values:

$$a + 5/4 \pm 1/4\lambda;\ a + 9/4 \pm 1/4\lambda;\ \ldots\ a + (n + 1/4) \pm 1/4\lambda$$

wherein $n$ is an integer.

Correspondingly, the sound wave amplitude increases and concurrently the focussing improves by becoming sharper due to the fact that distances from the probe to the focal point 29 in the adjacent groups change at a faster rate when shifting the focal point 29, FIG. 4, from the axis 31 than in the main group 32 above. The principal physical action of this arrangement corresponds with that of the known Fresnel zone lens.

This arrangement is electrically excited in the same manner as in the patent supra using a control unit 54, FIG. 5. The control unit, as a typical example, comprises shift registers and each transducer probe of the array 28, FIG. 4, is assigned to a position in the register. In order to shift the firing of a main group 32 across the linear array 28, a sequence of four consecutively following trigger pulses is shifted by one position responsive to the timing signal of the shift register. In accordance with the present invention, not only is a group of four pulses shifted, but groups of pulses having the sequences, considering the example per FIG. 4, two pulses, two timing pauses, two pulses, three timing pauses, four pulses, three timing pauses, two pulses, two timing pauses, two pulses. Such a pulse sequence can be derived quite readily by an arrangement which includes for each pulse group and each timing pause group a respective preset counter. In order to develop the program for the desired probe array size relative to distance $a$, it is advisable to prepare a suitable sketch as shown in FIG. 4. The sequence of solid and white probes along the array 28 corresponds to the sequence of pulses and timing pauses. The pulse sequence may be preset into the shift register corresponding to the probes located at one edge of the array 28. Responsive to the receipt of a timing signal the entire sequence will shift one position in the shift register, thereby trigger an adjacent, overlapping group of transducer elements. In this manner the sequence of pulses is shifted until each element and group of the linear array 28 is triggered. Concurrently, the focal point 29 traverses the entire dimension of a workpiece, to scan such workpiece for anomaly responsive echo signals. The anomaly responsive echo signals are received by the transducer probes and processed in the control unit 54 and pulse-echo ultrasonic instrument for subsequent display on the screen of a cathode ray tube. The length of the probe array 28 must exceed the width of the workpiece by at least one half group width at each edge. In this manner, the focal point 29 will commence and terminate at the respective edge of the workpiece.

The group boundary line associated with the term $a + x\lambda$ i.e. lines 30, are disposed at a distance of $$y_x = \sqrt{2ax\lambda + x^2\lambda^2}$$

from the center of the main group 32 along the linear array 28. In the case when the distance $a$ is large in relation to the wavelength $\lambda$ a good approximation is:

$$y_x = \sqrt{2ax\lambda}$$

If the $y_x$-value calculated does not coincide with the boundary between two probes of the array, the figure is rounded off to the required value.

A further improvement is obtained if the pulse generators 40 to 46 and receiver amplifiers 47 to 53 of FIG. 5 are provided with a disconnectable phase inverter stage. A second shift register operating in parallel with the control unit 54 is controlled to cause the second shift register to activate a phase inversion for the transducer probes between the lateral groups of triggered transducer probes, i.e. the white probes of FIG. 4. In this manner, the "white" probes will transmit and/or receive ultrasonic energy 180° out of phase with the "triggered" probes, thereby causing a positive contribution to the ultrasonic energy at focal point 29 and receiving anomaly responsive signals therefrom instead of being inactive during the timing pause signal. Whereas the resolution is further improved by this described arrangement, the additional electronic circuitry required can be justified only in specific instances.

Figure 8:
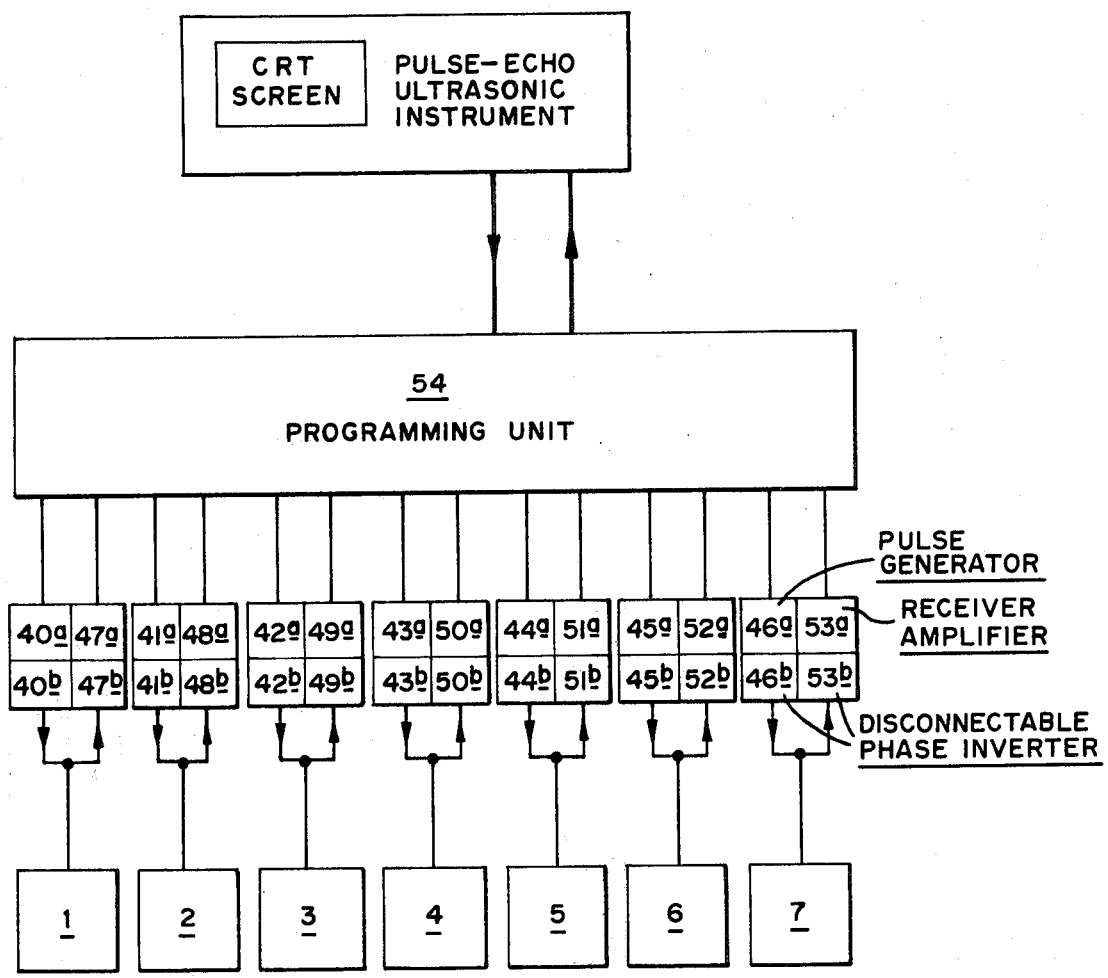
FIG. 8 is a schematic block diagram of an alternative embodiment of the switching circuit.

In FIG. 8 a schematic electrical block diagram for triggering probes in phase and 180° out of phase is shown. The pulse generators 40a through 46a and receiver amplifiers 47a through 53a all perform the function as described in conjunction with the embodiment per FIG. 5. In the present embodiment, programming unit 54 in addition to containing a shift register for causing the respective pulse generators and receiver amplifiers corresponding to the solid probes to transmit and receive ultrasonic signals also contains an additional shift register. The additional shift register causes the respective disconnectable phase inverter stages 40b through 53b (one associated with each respective pulse generator and receiver amplifier) when in circuit with the white probes to transmit and receive ultrasonic signals 180° out of phase with the generators and amplifiers associated with the solid probes. The disconnectable phase inverter stages, designated with the suffix $b$, are designed to be 180° out of phase with the pulse generators and receiver amplifiers designated with the suffix $a$. In this manner each of the solid and white probes are operative during each cycle.

While one embodiment, using an additional shift register has been described and illustrated, it will be apparent to those skilled in the art that alternative logic circuits, such as logic inverters coupled to the outputs of the first shift register, may be used for causing the white probe when in circuit with the disconnectable phase inverter stages to transmit and receive ultrasonic signals concomitantly with the in phase transmissions and receipt of ultrasonic signals by the apparatus associated with the solid probes. Also, while in the above described embodiment the white probes transmit and receive 180° out of phase signals, it will be apparent that the white probes can be used for only transmitting or receiving ultrasonic signals instead of performing both functions.

In this connection it must be observed that it is not useful to obtain a resolution as high as possible by programming any number of auxiliary or subgroups 33a, 33b and the like. In the case when the number of auxiliary groups programmed surpasses the quantity of oscillations within the ultrasonic pulse, the sound from the outermost auxiliary groups arrives after the pulse transmitted along the shortest path, axis 31 per FIG. 4, has already decayed. In that event, all the components originating from the transducer array are no longer coherent, specifically the outer laterally disposed groups no longer contribute to an improved resolution at the focal point 29, Krautkramer supra, illustration 1.78 and text.

The above invention is not restricted to the heretofore described embodiments. Although the resolution along one dimension, e.g. in drawing plane per FIG. 4, is improved by the embodiments described, no improvement of resolution is achieved in the plane perpendicular to the drawing plane in which the resolution is generally deficient. This holds true particularly when providing sectional views of internal organs as in the medical field.

The foregoing disadvantage can be overcome by dividing a linear transducer probe array as shown in FIG. 4 into individual probes along a plane perpendicular to the plane of the drawing. This produces a mosaic array which is activated and pulsed in accordance with the program explained in conjunction with FIG. 4 for utilizing the Fresnel zone lens effect. However, the complexity of the electronic circuitry will increase greatly in instances when the transducer probe mosaic is utilized for providing images of workpieces which fail to exhibit contours. In this latter case the mosaic of transducer probes must be finely subdivided.

The width of the individual probes must be selected to provide the required lateral resolution. The element width along the array 28 must be equal to or preferably smaller than the desired resolution, since the defect size is determined by multiplying the element width times the number of adjacent groups which receive defect responsive echo signals. For example, if a resolution of one mm is desired and if the workpiece has a width of 100 mm, the array 28 must have at least 100 elements plus half a group width at each end of the array. The number of elements in the group can be determined from the equations for $Y_x$ above.

Figure 6:
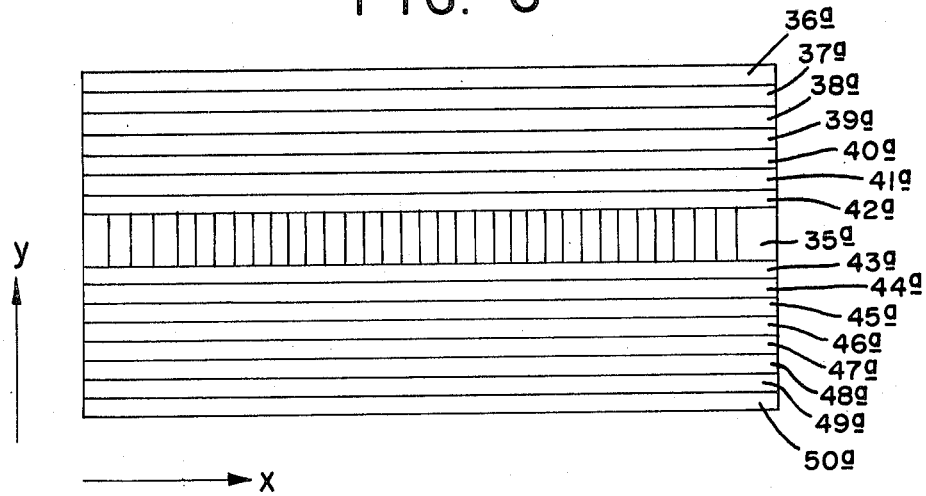
FIG. 6 is a plan view of an alternative transducer array.

According to another embodiment of the invention the complexity described heretofore can be reduced considerably if, in accordance with FIG. 6, separate band arrays are used for the transmit and the receiver test probe elements. In this case, the linear array 35a comprising a plurality of individual test probes, shown in top plan view, is operated as a band transducer as has been described hereinbefore. However, only the receiver section is shifted. Hence, a high resolution is obtained in the X-direction. Adjacent to this line, a plurality of juxtaposed band-shaped transmitter transducer elements 36a to 50a are provided. The latter elements, forming the second portion of the probe array, are switched on and off in accordance with the zone lens program as has been described in conjunction with the embodiments hereinabove. This arrangement causes the transmitted sound beam to provide a high resolution in the Y-direction. Using pulse-echo operation, a nearly point-shaped resolution can be obtained along both axes. Furthermore, it is possible also to interchange transmitter and receiver array portions. Most suitably the switching program for the transmitter and receiver band portions is arranged to cause the focal distance, see FIG. 4, to be identical for both portions.

Figure 7:
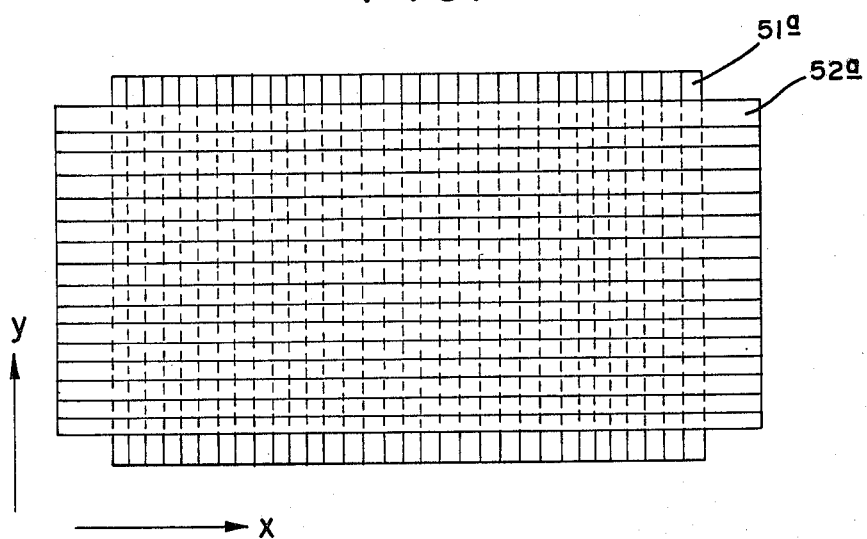
FIG. 7 is a plan view of a still further transducer probe system.

A still further modification is apparent by reference to FIG. 7 wherein the linear array of probes 35a is widened to form a transducer probe 51a subdivided into bands. The similarly band-subdivided transmitter element 52a can be bonded upon the receiver element 51a in such a manner that the arrays of bands cross one another and a sonic energy contact exists between the elements 51a and 52a. The operation corresponds to that of FIG. 5 with the difference that the sonic energy produced in topmost element 52a is transmitted to the workpiece after propagating through the element 51a. Here too, the transmitter and receiver portions are interchangeable.

Another advantage of the embodiment per FIG. 7 is improved sensitivity due to the larger radiating surface of transducer bands 51a as compared to probe 35a. Another advantage is that the transmitter element 52a as well as the receiver element 51a can both be programmed in groups along their bands. The programming is in a manner so that receiver element 51a is cycled at a repetition rate as high as possible while transmitter element 52a is shifted only after the entire array 51a has been triggered, thus, not only is a line scanned, but an area is scanned making it thereby possible to present a C-scan with high resolution in the X-direction as well as the Y-direction.

What is claimed is:

1. A transducer system for ultrasonic testing comprising:
   a linear array of ultrasonic transducer probes adapted to be coupled to the surface of a workpiece for transmitting ultrasonic sound waves into a workpiece and for receiving ultrasonic waves reflected therefrom;
   electrical pulse generating means for providing electrical high frequency pulses to probes coupled to said generating means;
   receiving means for receiving and displaying signals responsive to reflected ultrasonic waves received by said probes, and
   means coupling said generating means and receiving means to a central group of juxtaposed probes selected from said array and to additional groups of juxtaposed probes spaced laterally from said central group for causing the probes coupled to transmit simultaneously ultrasonic waves into the workpiece and to receive reflected ultrasonic waves therefrom arising from an acoustic discontinuity, and to provide signals responsive to the received waves to said receiving means, the width comprising a respective group of probes and the lateral spacing of each group from said central group along the axis of said array being selected to cause the respective acoustic pressures of the sound waves propagated from the individual probes to add positively in the acoustic near-field focal zone which is associated with the waves propagated from said central group and disposed in the workpiece.

2. A transducer system for ultrasonic testing as set forth in claim 1, the width of said central group of probes operated concurrently being selected in accordance with the relation:

$$b \approx 2\sqrt{a\lambda}$$

wherein $b$ is the width of the central group,
$a$ is the distance from the central group to the near-field focal zone,
and $\lambda$ is the wavelength of sound in the workpiece;
and the probes forming said additional groups being located to cause their respective distances from said focal zone to assume the values:

$$a + 5/4 \pm 1/4\lambda; \ a + 9/4 \pm 1/4\lambda; \ .... \ a + (n + 1/4)\lambda \pm 1/4\lambda;$$

wherein $n$ is a positive integer.

3. A transducer system for ultrasonic testing as set forth in claim 2, said coupling means incrementally shifting said groups transmitting and receiving ultrasonic waves along the axis of said array to cause said focal zone to move concomitantly.

4. A transducer system for ultrasonic testing as set forth in claim 3, said coupling means incrementally shifting said groups transmitting and receiving ultrasonic waves comprising electronic switching means.

5. A transducer system for ultrasonic testing as set forth in claim 4, and further means coupled to said pulse generating means and to the probes disposed in the spaces between said groups of juxtaposed probes for energizing the probes disposed in said spaces with high frequency pulses whose phase is 180° shifted with respect to the pulses provided to said groups selected from said array.

6. A transducer system for ultrasonic testing as set forth in claim 4, and further means coupled to said receiving means and to the probes disposed in the spaces between said groups of juxtaposed probes for causing said probes disposed in said spaces to provide to said receiving means waves whose phase is 180° shifted with respect to the signals responsive to reflected waves provided by the probes forming said groups.

7. A transducer system for ultrasonic testing as set forth in claim 4, said receiving means coupled to said probes providing a display of signals responsive to reflected waves with respect to amplitude and position of an acoustic discontinuity in the workpiece.

8. A transducer system for ultrasonic testing comprising:

an array of ultrasonic transmit-receive transducer probes adapted to be coupled to the surface of a workpiece for transmitting ultrasonic sound waves into a workpiece and for receiving ultrasonic waves reflected therefrom; said array comprising a first portion which includes a plurality of substantially parallel juxtaposed probes and a second portion which includes a plurality of substantially parallel band shaped juxtaposed probes disposed on either side of the probes forming said first portion and in adjacent relationship therewith, the axis along which the probes forming said first portion are aligned being substantially transverse with respect to the axis along which the probes forming said second portion are aligned;

electrical pulse generating means for providing electrical high frequency pulses to probes coupled to said generating means;

receiving means for receiving and displaying signals responsive to reflected ultrasonic waves received by said probes;

means coupling said receiving means to a central group of juxtaposed probes selected from one of said portions and to additional groups of juxtaposed probes selected from said one portion and spaced laterally from said central group for causing the probes so selected to receive simultaneously acoustic discontinuity responsive ultrasonic waves from the workpiece, the width comprising a respective group of probes and the lateral spacing of each group from said central group along the axis of the array portion being selected to cause the acoustic pressures of sound waves propagated from the individual transmit-receive probes to add positively in the acoustic near-field focal zone which is associated with the waves propagated from said central group and disposed in the workpiece;

said coupling means connecting said pulse generating means to probes forming said other portion for causing the latter probes connected to transmit ultrasonic waves into the workpiece, and display means coupled to said coupling means for receiving and displaying signals responsive to an acoustic discontinuity in the workpiece.

9. A transducer system for ultrasonic testing as set forth in claim 8, said coupling means connecting said generating means to selected probes forming said other portion for causing the respective acoustic pressures of sound waves propagated from the selected transmit-receive probes of said other portion to add positively in said near-field focal zone.

10. A transducer system for ultrasonic testing as set forth in claim 8, and shift register means coupled to said coupling means for incrementally shifting said groups of probes receiving ultrasonic waves responsive to an acoustic discontinuity along the axis of the associated array portion.

11. A transducer system for ultrasonic testing as set forth in claim 8, said first portion and said second portion of probes being disposed substantially in the same plane.

12. A transducer system for ultrasonic testing comprising:

an array of ultrasonic transducer probes adapted to be coupled to the surface of a workpiece for transmitting ultrasonic sound waves into a workpiece and for receiving ultrasonic waves reflected therefrom; said array comprising a first portion which includes a plurality of substantially parallel aligned juxtaposed band shaped probes and a second portion of substantially parallel aligned juxtaposed band shaped probes superposed on said first portion and disposed transverse with respect to the probes forming said first portion;

electrical pulse generating means for providing electrical high frequency pulses to probes coupled to said generating means;

receiving means for receiving and displaying signals responsive to reflected ultrasonic waves received by said probes;

means coupling said pulse generating means to one portion and said receiving means to the other portion, and at least one of the portions being connected for providing a central group of juxtaposed probes selected from said one portion and for providing additional groups of juxtaposed probes of said one portion spaced laterally from said central group for causing the probes so selected to be simultaneously in circuit with said coupling means, the width comprising a respective group of probes and the lateral spacing of each group from said central group along the axis of the associated array being selected to cause the acoustic pressures of sound waves propagated from the individual probes to add positively in the acoustic near-field focal zone which is associated with the waves propagated from said central group and disposed in the workpiece, and display means coupled to said coupling means for receiving and displaying signals responsive to an acoustic discontinuity in the workpiece.

13. A transducer system for ultrasonic testing as set forth in claim 12, and both of said portions being connected for providing a respective central group and respective additional groups.

14. A transducer system for ultrasonic testing as set forth in claim 12, said array portion connected for providing said central group and said additional groups being coupled to said receiving means.

15. A transducer system for ultrasonic testing as set forth in claim 12, said coupling means connecting said pulse generating means to said second portion.

16. A transducer system for ultrasonic testing as set forth in claim 12, both of said portions being connected for providing a respective central group and respective additional groups, and shift register means coupled in circuit with said coupling means for incrementally shifting said respective groups of probes transmitting and receiving respectively ultrasonic waves along the axis of their respective array portion.

17. A transducer system for ultrasonic testing as set forth in claim 16, said shift register means cyclically shifting the portion connected to said receiving means at a greater rate than the portion connected to said pulse generating means.

* * * * *